United States Patent
Montevirgen

(10) Patent No.: US 10,728,347 B1
(45) Date of Patent: Jul. 28, 2020

(54) SHARED ACCESS TO COMPUTING RESOURCES USING WIRELESS COMMUNICATIONS

(71) Applicant: Anthony S. Montevirgen, Milpitas, CA (US)

(72) Inventor: Anthony S. Montevirgen, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/423,334

(22) Filed: May 28, 2019

Related U.S. Application Data

(60) Provisional application No. 62/712,532, filed on Jul. 31, 2018.

(51) Int. Cl.
| | | |
|---|---|---|
| *H04L 29/08* | (2006.01) | |
| *H04W 4/80* | (2018.01) | |
| *H04W 4/029* | (2018.01) | |

(52) U.S. Cl.
CPC ........... *H04L 67/18* (2013.01); *H04L 67/303* (2013.01); *H04L 67/306* (2013.01); *H04W 4/80* (2018.02); *H04W 4/029* (2018.02)

(58) Field of Classification Search
CPC ....... H04W 4/029; H04W 4/80; H04W 64/00; H04W 4/02; H04L 67/18; H04L 67/306; H04L 67/303
See application file for complete search history.

(56) References Cited

U.S. PATENT DOCUMENTS

| | | | |
|---|---|---|---|
| 9,008,593 B2 | 4/2015 | Rofougaran et al. | |
| 9,866,286 B1 | 1/2018 | Qu et al. | |
| 9,948,413 B1 | 4/2018 | Zhou et al. | |
| 2003/0217151 A1* | 11/2003 | Roese | G01S 5/02 |
| | | | 709/225 |
| 2011/0045767 A1 | 2/2011 | Rofougaran et al. | |
| 2015/0094098 A1* | 4/2015 | Stern | H04W 4/029 |
| | | | 455/456.3 |
| 2017/0238191 A1 | 8/2017 | Bahl et al. | |
| 2017/0257750 A1* | 9/2017 | Gunasekara | H04W 4/06 |
| 2017/0286328 A1 | 10/2017 | Grosse-Puppendahl et al. | |
| 2018/0020320 A1 | 1/2018 | Choi et al. | |
| 2018/0020480 A1 | 1/2018 | Yang et al. | |
| 2018/0027044 A1 | 1/2018 | Yuen et al. | |

(Continued)

OTHER PUBLICATIONS

Cheevers, C., et al., "Virtual and Augmented Reality—How Do They Affect the Current Service Delivery and Home and Network Architectures?", ARRIS Enterprises LLC, 2016 (35 pp).

(Continued)

*Primary Examiner* — Margaret G Mastrodonato
(74) *Attorney, Agent, or Firm* — Young Basile Hanlon & MacFarlane, P.C.

(57) ABSTRACT

A method includes determining a location of a device based on wireless communication of the device with one or more line-of-sight dependent communication devices that allow data transmission between the device and a base station, determining content to be provided to the device based in part on the location of the device, performing computing operations that correspond to the content at the base station using inputs transmitted to the base station from the device, and transmitting outputs of the computing operations from the base station to the device for display at the device.

20 Claims, 10 Drawing Sheets

(56) References Cited

U.S. PATENT DOCUMENTS

| | | |
|---|---|---|
| 2018/0041905 A1 | 2/2018 | Ashrafi |
| 2018/0062719 A1 | 3/2018 | Verma et al. |
| 2018/0070196 A1 | 3/2018 | Sanders |
| 2018/0091819 A1 | 3/2018 | Cook et al. |
| 2018/0093177 A1 | 4/2018 | Tokubo |
| 2018/0107441 A1 | 4/2018 | Aurongzeb et al. |

OTHER PUBLICATIONS

Genç, Z., "Home Networking at 60 GHz", Thesis, Feb. 2014, https://www.researchgate.net/publication/269697376 (159 pp).

Kim, J., et al., "Strategic Control of 60 GHz Millimeter-Wave High-Speed Wireless Links for Distributed Virtual Reality Platforms", Hindawi, Mobile Information Systems, vol. 2017, Article ID 5040347, https://doi.org/10.11551/2017/5040347 (9 pp).

Brodsky, I., "Why WiGig Will Be a Wireless Game-Changer", IDG Contributor Network, Feb. 22, 2017 (6 pp.).

ABIResearch, "802.11 ad Will Vastly Enhance Wi-Fi—The Importance of the 60 GHz Band to Wi-Fi's Continued Evolution", www.abiresearch.com, Apr. 2016 (12 pp).

\* cited by examiner

SHARED ACCESS TO COMPUTING RESOURCES USING WIRELESS COMMUNICATIONS

CROSS-REFERENCE TO RELATED APPLICATIONS

This application claims the benefit of U.S. Provisional Application No. 62/712,532 filed on Jul. 31, 2018, the content of which is incorporated by reference herein in its entirety for all purposes.

FIELD

The present disclosure relates generally to the field of systems for sharing computing resources.

BACKGROUND

Computing devices come in many forms and are incorporated are in many types of devices. Examples include desktop computers, laptop computers, tablet computers, gaming consoles, television set-top boxes, smart televisions, smart speakers, computer-generated reality display devices, smart phones, and smart watches.

SUMMARY

One aspect of the disclosure is a method that includes determining a location of a device based on wireless communication of the device with one or more line-of-sight dependent communication devices that allow data transmission between the device and a base station, determining content to be provided to the device based in part on the location of the device, performing computing operations that correspond to the content at the base station using inputs transmitted to the base station from the device, and transmitting outputs of the computing operations from the base station to the device for display at the device.

In some implementations of the method, determining the content to be provided to the device includes determining that a first content item is to be provided to the device if the location of the device is a first location and determining that second content item is to be provided to the device if the location of the device is a second location.

In some implementations of the method, determining the content to be provided to the device includes determining that a first graphical theme is to be provided to the device if the location of the device is a first location and determining that a second graphical theme is to be provided to the device if the location of the device is a second location.

In some implementations of the method, determining the content to be provided to the device includes determining that a first list of available content is to be provided to the device if the location of the device is a first location and determining that a second list of available content is to be provided to the device if the location of the device is a second location.

Determining the content to be provided to the device is based in part on a device type for the device. Determining the content to be provided to the device may be based in part on an identity of a user of the device. In some implementations, the identity of the user of the device is determined by obtaining a biometric signal from the device and matching the biometric signal to a user profile at the base station.

In some implementations of the method, determining content to be provided to the device is based in part on presence of co-located devices at the location of the device.

In some implementations of the method, the method includes determining that the location of the device has changed from a first location to a second location, determining that access to the content is not allowed at the second location, and terminating computing operations for the content.

In some implementations of the method, the one or more line-of-sight dependent communication devices use a 60 GHz frequency band.

Another aspect of the disclosure is a system that includes a base station, a device, a first access point that provides line-of-sight dependent wireless communication with the device to allow data transmission between the base station and the device when the device is present at a first location, and a second access point that provides line-of-sight dependent wireless communication with the device to allow data transmission between the base station and the device when the device is present at a second location. The base station is operable to provide computing resources to the device, the base station provides the device with access to a first group of content items when the device connects to the base station using the first access point, and the base station provides the device with access to a second group of content items when the device connects to the base station using the second access point.

In some implementations of the system, the base station causes a user interface screen of the device to use a first graphical theme when the device connects to the base station using the first access point, and the base station causes the user interface screen of the device to use a second graphical theme when the device connects to the base station using the second access point.

The first group of content items and the second group of content items may be dependent on a device type for the device. The first group of content items and the second group of content items may be dependent on an identity of a user of the device. The identity of the user of the device may be determined by the base station using a biometric signal that is received from the device.

In some implementations of the system, the first access point and the second access point are each operable to communicate with the device using a 60 GHz frequency band.

Another aspect of the disclosure is a method. The method includes providing computing resources to a device from a first base station using a first line-of-sight dependent wireless communication link, storing user data at the first base station, determining that the device has disconnected from the first base station, and, in response to determining that the device has disconnected from the first base station, transmitting at least some of the user data from the first base station to a second base station to define synchronized user data at the second base station. The method also includes providing computing resources to the device from the second base station using a second line-of-sight dependent wireless communication link and based in part on the synchronized user data.

In some implementations of the method, the first base station is at a first location, the second base station is at a second location, and the first location is remote from the second location such that the device cannot connect to the second base station using the second line-of-sight dependent wireless communication link while the device is present at the first location.

In some implementations of the method, transmitting at least some of the user data from the first base station to the second base station to define the synchronized user data at the second base station occurs while the device is in transit from the first location to the second location.

In some implementations of the method, the first line-of-sight dependent wireless communication link and the second line-of-sight dependent wireless communication link use a 60 GHz frequency band.

DETAILED DESCRIPTION

The disclosure herein relates to a computing system in which computing resources at a base station are shared with multiple connected devices using a high-bandwidth wireless communication link. The connected devices include input and output functionalities, as opposed to being configured solely for output. Sharing the computing resources of the base station with the connected devices allows computing power, data storage, and user preference storage to be centralized, as opposed to requiring redundant computing power and information storage at each of multiple devices. As a result, the connected devices may be simplified, have reduced power consumption, increased battery life, reduced mass, and reduced cost. High-powered computing devices can be present only in the base station, and may be omitted from the connected devices, limiting the need for thermal management at the connected devices, and instead allowing thermal management to be handled centrally at the base station. In addition, data stored at the base station remains available if one of the connected devices is lost or damaged. Also, performance upgrades may be made at the base station only and provide benefits to all of the connected devices.

Figure 1:
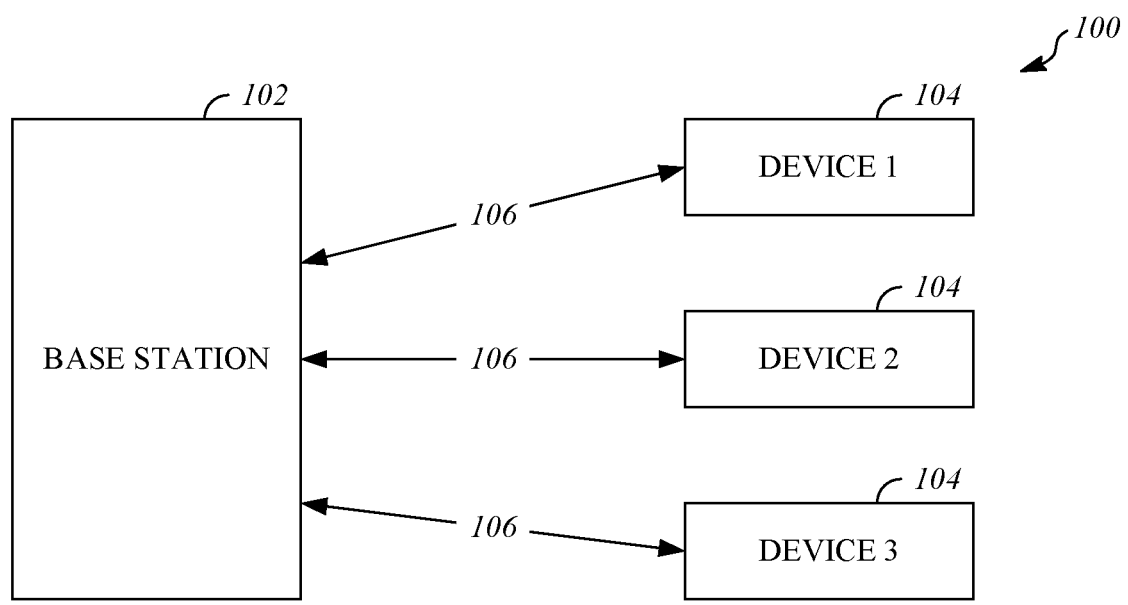
FIG. 1 is a block diagram that shows a computing system that includes a base station and connected devices.

FIG. 1 is a block diagram that shows a computing system 100. The computing system 100 includes a base station 102 and connected devices 104. Each of the connected devices 104 communicates with the base station 102 using a wireless communication link 106. For example, each of the connected devices 104 may transmit information to the base station 102 using the wireless communication link 106, and the base station 102 may transmit information to the connected devices 104 using the wireless communication link 106.

Generally stated, the base station 102 is a computing device that is configured to provide computing resources to the connected devices 104. The base station 102 may be co-located with the connected devices 104, such as by presence in the same building (e.g., home or business), and by direct, local connection to the wireless communications devices used to establish the wireless communication link 106 between the base station 102 and each of the connected devices 104.

The connected devices 104 are devices that can benefit from use of the computing resources of the base station 102. As examples, the connected devices may include desktop computers, laptop computers, tablet computers, gaming consoles, television set-top boxes, smart televisions, smart speakers, computer-generated reality display devices (e.g., including virtual reality and augmented reality), smart phones, and smart watches. Multiple different types of the connected devices 104 with varied architectures and configurations may be concurrently used in conjunction with the base station 102.

Some of the connected devices 104 may include only minimal computing resources, intended to allow strictly local functions to be performed, such as reading input devices, managing communications functions, and causing content to be output for display. In these types of implementations, application software may be present only at the base station 102, and all application specific computing functions may be performed at the base station 102. Thus, the base station 102 may allow one of the connected devices 104 to use an application and/or deliver content from that application from a user, when doing so would not be possible without use of the computing resources at the base station 102.

Some of the connected devices 104 include computing resources that allow application software to be executed at the connected devices 104, without use of the base station 102. In such implementations, additional computing resources can be provided by the base station 102 to enhance use of the application software (e.g., faster processing, more visual detail, higher framerates, higher spatial resolution), to perform certain compute-intensive functions, to reduce battery usage by the connected devices 104, and/or to reduce heat generation by the connected devices 104. Thus, the base station 102 may enhance the way content is used and/or presented to a user, when additional computing resources are provided to the connected devices 104, as compared to when the computing tasks associated with the content are performed only at the respective one of the connected devices 104 without using additional computing resources from the base station 102.

In the illustrated example, three of the connected devices 104 are shown as being in communication with the base station 102. It should be understood, however, that the base station 102 is not limited to operation using three of the connected devices 104 and can be used with other numbers of the connected devices 104 such as with one of the connected devices 104 or with twelve of the connected devices 104.

The wireless communication link 106 is a high-bandwidth, low-latency data connection. As an example, the wireless communication link 106 may be configured to support data transfer at sustained rates of greater than six gigabits per second. The wireless communication link 106 may be implemented using a 60 GHz frequency band (i.e., between approximately 57 GHz and 64 GHz). Do to use of high-frequencies, such as the 60 GHz frequency band, the wireless communication link 106 may be line-of-sight dependent, meaning that the signal quality between a transmitter and a receiver degrades dramatically if any physical barriers (e.g., walls, people, etc.) For example, the wireless communication link 106 may be implemented using the Wi-Gig standard or the IEEE 802.11ad standard, which are well-suited to high-bandwidth, low-latency wireless data transmission applications in which line-of-sight is available.

Figure 2:
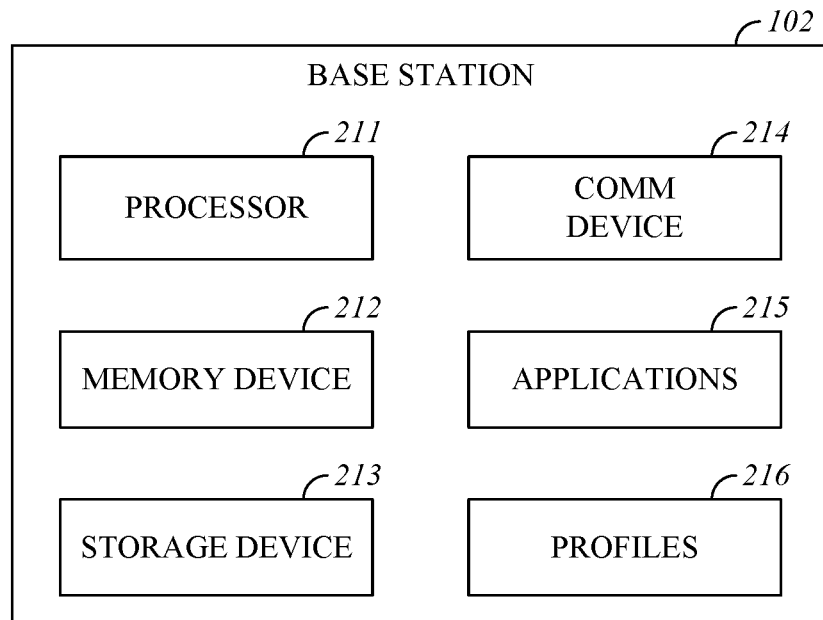
FIG. 2 is a block diagram that shows an example of a hardware configuration that can be used to implement the base station.

FIG. 2 is a block diagram that shows an example of a hardware configuration that can be used to implement the base station 102. The base station 102 may include a processor 211, a memory device 212, a storage device 213, and a communications device 214. The storage device 213 may be used to store information that is utilized when providing computing services to the connected devices 104, such as applications 215 and profiles 216.

The processor 211 is a device that is operable to execute computer program instructions and is operable to perform operations that are described by the computer program instructions. The processor 211 may be implemented using a conventional device, such as a central processing unit. The memory devices 212 may be a volatile, high-speed, short-term information storage device such as a random-access memory module. The storage device 213 is intended to allow for long term storage of computer program instructions and other data. Examples of suitable devices for use as the storage device 213 include non-volatile information storage devices of various types, such as a flash memory module, a hard drive, or a solid-state drive.

The communications device 214 supports wireless communications according to the previous description of the wireless communication link 106. The communications device 214 may also support wired or wireless communications connections according to other protocols.

The applications 215 are computer programs that are executed by the base station 102, are operable to provide content to be displayed at the connected devices 104, and are operable to respond (e.g., change an aspect of execution of the program) to inputs received from the connected devices 104. The profiles 216 each contain information that is associated with a particular user or a particular device. The profiles 216 are stored only with permission from the users, and are encrypted to prevent unauthorized access to the information stored in them.

Since the base station 102 may function as a server computer that is only accessed remotely (e.g., through a terminal session or a browser-based configuration application), input devices and output devices are omitted, but could be included if desired for particular applications.

Figure 3:
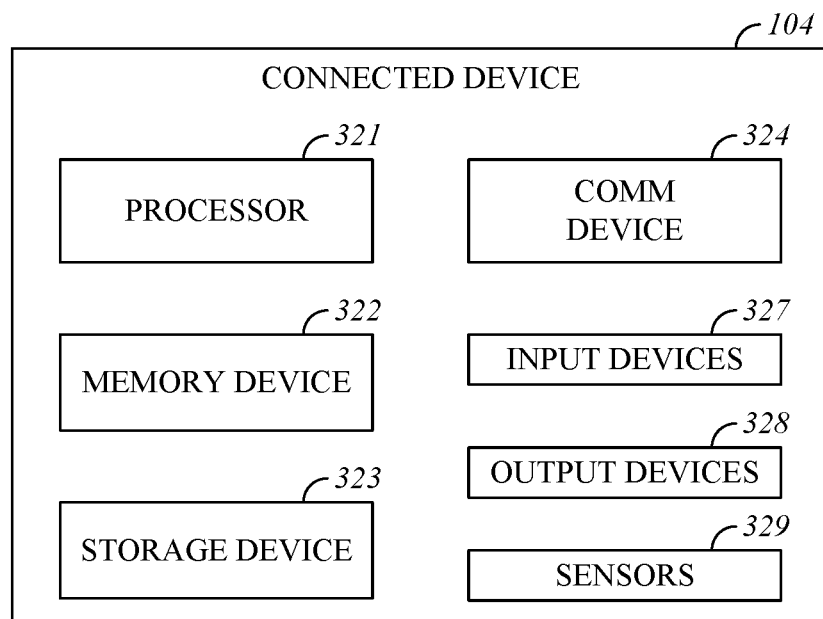
FIG. 3 is a block diagram that shows an example of a hardware configuration that can be used to implement the connected devices.

FIG. 3 is a block diagram that shows an example of a hardware configuration that can be used to implement the connected devices 104. The connected devices may each include a processor 321, a memory device 322, a storage device 323, a communications device 324, one or more input devices 327, one or more output devices 328, and sensors 329.

The processor 321 is a device that is operable to execute computer program instructions and is operable to perform operations that are described by the computer program instructions. The processor 321 may be implemented using a conventional device, such as a central processing unit. In some implementations of the connected devices 104, the processor 321 may be a special-purpose processor as opposed to a general-purpose processing device, and may implement limited set of functions, such as input management functions, content display functions, and communications functions.

The memory device 322 may be a volatile, high-speed, short-term information storage device such as a random-access memory module. The storage device 323 is intended to allow for long term storage of computer program instructions and other data. Examples of suitable devices for use as the storage device 323 include non-volatile information storage devices of various types, such as a flash memory module, a hard drive, or a solid-state drive. In some implementations of the connected devices 104, the storage device 323 is omitted.

The input devices 327 are human-machine interfaces that allow a user to directly interact with the base station 102 and may include, as examples, a keyboard, a touchscreen input device, a gestural input device, an audio input device (e.g., a microphone), a control stick, or a position-tracked controller. The output devices 328 may include, as examples, a display screen, a projected display, an audio output, or a haptic output.

The communications device 324 supports wireless communications according to the previous description of the wireless communication link 106. The communications device 324 may also support wired or wireless communications connections according to other protocols.

The sensors 329 are optional components that are incorporated in certain types of the connected devices, and may include conventional components such as cameras, infrared cameras, infrared emitters, depth cameras, structured-light sensing devices, accelerometers, gyroscopes, and magnetometers. The sensors 329 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 329, according to the configuration and purposes of the connected devices, and the information (i.e., sensor output signals) generated by the sensors can be transmitted to the base station 102.

Figure 4:
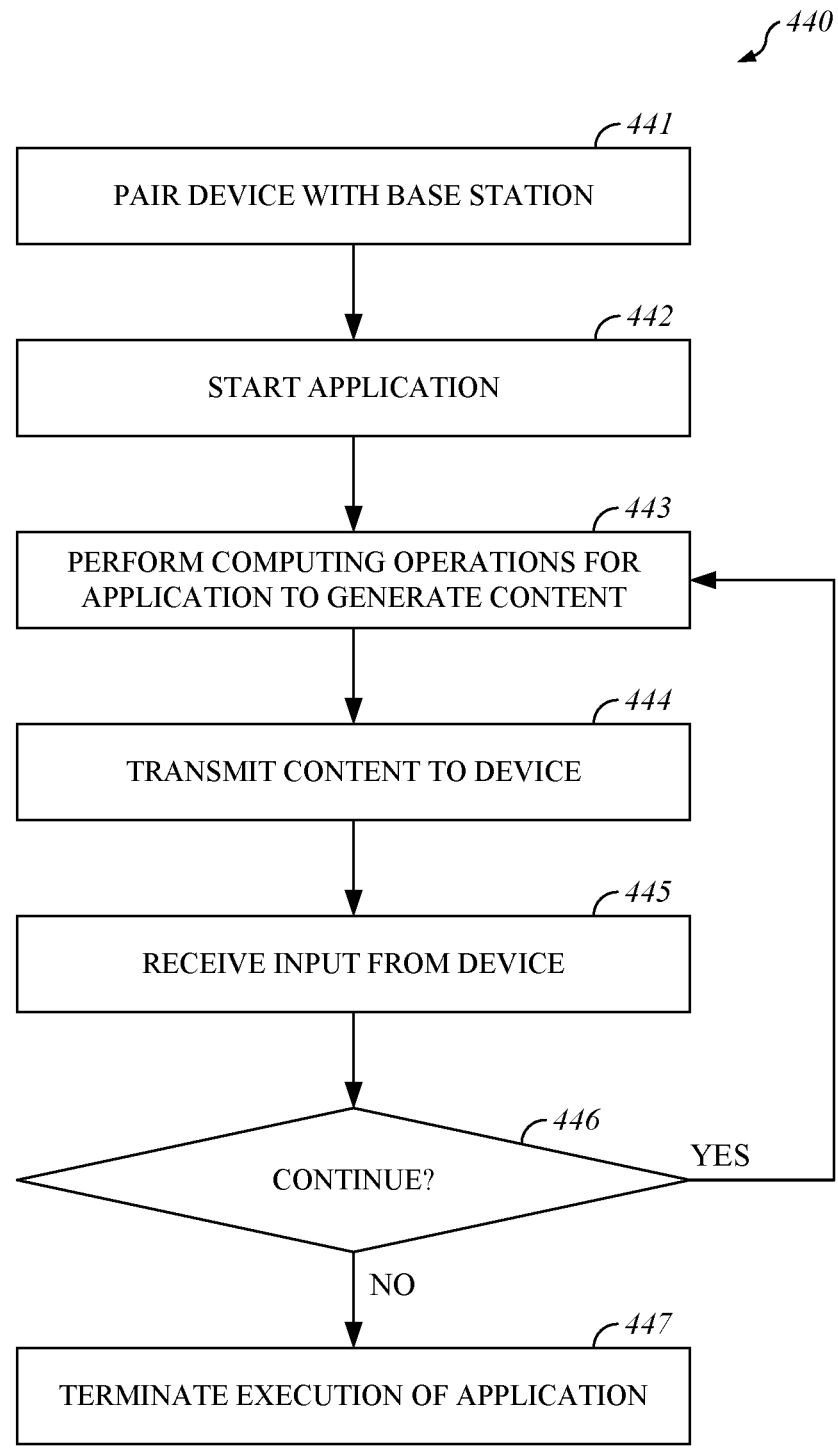
FIG. 4 is a flowchart that shows an example of a process for sharing computing resources between the base station and the connected devices.

FIG. 4 is a flowchart that shows an example of a process 440 for sharing computing resources between the base station 102 and the connected devices 104. The process 440 may be performed, for example, using a computer device that includes a processor and a memory that stores program instructions, wherein the program instructions cause the processor to perform the operations that are included in the process 440 when the program instructions are executed by the processor. As an example, the process 440 can be performed using the base station 102 and one or more of the connected devices 104.

In operation 441, a device, such as one of the connected devices 104, is paired with a base station, such as the base station 102. Pairing the device with the base station establishes a communications link between the device and the base station, as described with respect to the wireless communication link 106. When the device and the base station are paired, information can be sent from the device to the base station for use in computing operations, and the output of those computing operations can be transmitted to the device for display to a user of the device.

In operation 442, execution of an application is started at the base station. Execution of the application can be started, for example, in response to a request that is made by a user of the device, such as selection of the application from a menu that is displayed at the device. Thus, operation 442 may include receiving a user input at the device that selects an application, transmitting the request from the device to the base station, and initiating execution of the application at the base station.

In operation 443, the base station performs computing operations that are part of the application for which execution was initiated in operation 442. The computing operations that are performed in operation 443 generate content. Content means any text, graphics, user interfaces, applications, or other information in any form that can be transmitted from the base station to the device and output for display by the device. In operation 444, the content generated by the computing operations that were performed in operation 443 are transmitted from the base station to the device. At the device, in response to receiving the transmission of content from the base station 102, the device can output the content for display to the user. Stated another way, after the base station commences performance of computing operations that correspond to the content, the base station commences transmitting the outputs that correspond to the content in a manner that allows those outputs to be displayed to a user by way of the device.

In operation 445, information is received at the base station that represents an input made at the device. The term input means information collected by any component that is associated with the device, including information from human-machine interfaces representing explicit inputs made by users, and including information made from sensors that sense conditions of the device or conditions of the environment around the device. Therefore, the inputs may be obtained by the device as signals from input devices or sensors, and the signals and/or information corresponding to the signals may be transmitted from the device to the base station. The inputs are utilized by the base station in the computing operations that correspond to the content, as described with respect to operation 443, such that the computing operations are performed in dependence upon the inputs.

In operation 446, a decision is made at the base station as to whether execution of the application should be continued. Execution of the application can be terminated, for example, in response to satisfaction of a condition. The condition may be, as examples, receipt of a request from the device to terminate execution of the application, passage of a predetermined time period of inactivity, or loss of communications between the base station and the device. If it is determined that execution of the application should continue, the base station continues execution of the application and the process returns to operation 443 where the inputs from operation 445 are used by the base station in further computing operations. If it is determined that execution of the application should terminate, the base station terminates execution of the application in operation 447 and the process 440 ends. For example, terminating execution of the application can include terminating computing operations at the base station that correspond to the application and terminating transmission of content for display by the device.

Figure 5:
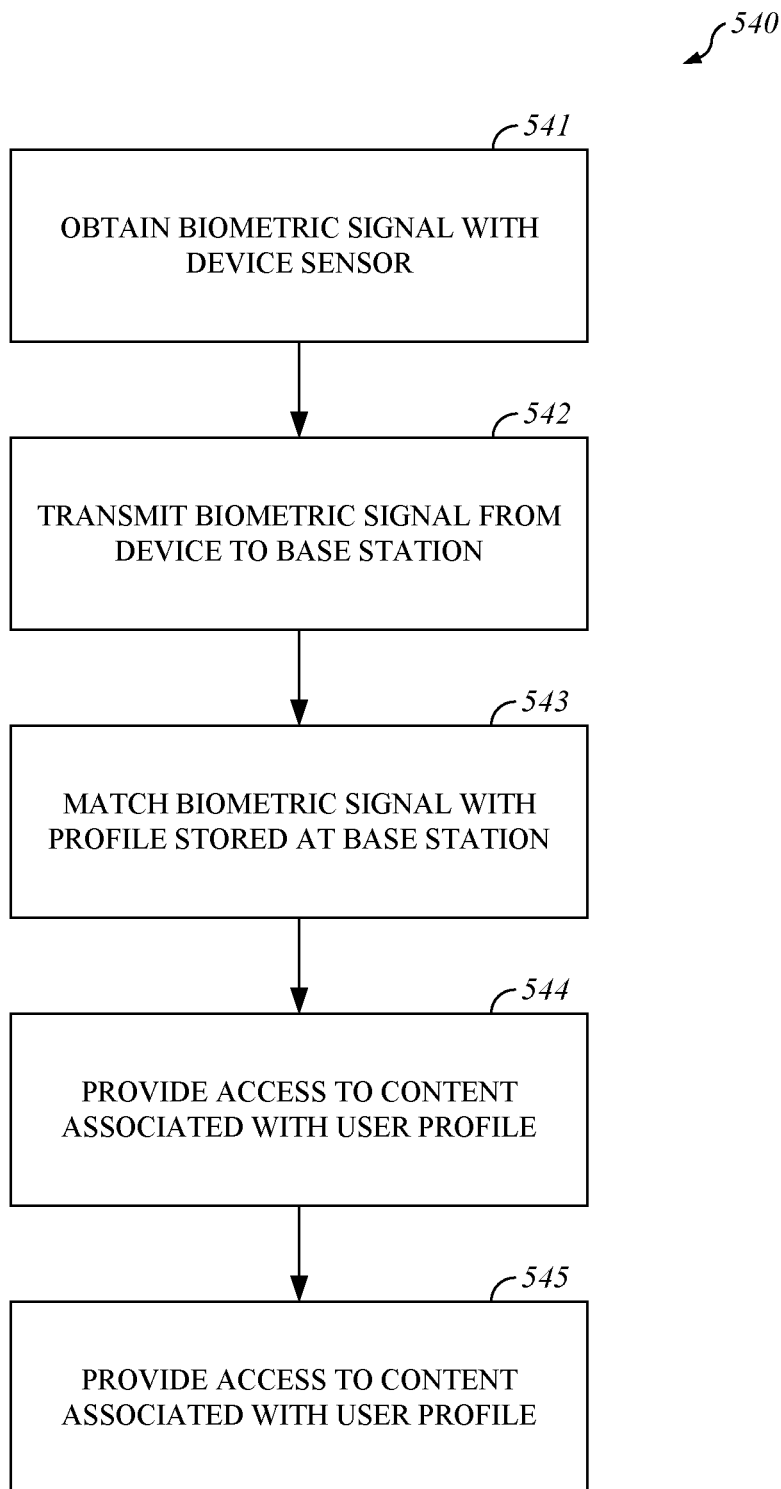
FIG. 5 is a flowchart that shows an example of a process for identifying a user of one of the connected devices.

FIG. 5 is a flowchart that shows an example of a process 540 for identifying a user of one of the connected devices 104. The process 540 may be performed, for example, using a computer device that includes a processor and a memory that stores program instructions, wherein the program instructions cause the processor to perform the operations that are included in the process 540 when the program instructions are executed by the processor. As an example, the process 540 can be performed using the base station 102 and one or more of the connected devices 104.

In operation 541, a biometric signal is obtained from a device sensor, which may be, for example, one of the sensors 329 of one of the connected devices 104. As one example, the biometric signal may be or include a scanned finger print of the user of the device. As another example, the biometric signal may be or include information that represents the appearance and/or three-dimensional shape of the user's faces, such as an image of the user's face, a series of images of the user's face, a depth-image of the user's face, or a point cloud representing the user's face. As another example, the biometric signal may be or include an audio recording of the user's voice or information representing an audio recording of the user's voice. As another example, the biometric signal may be or include imaging of all or part of the user's eye (e.g., a retinal scan). In operation 542, the biometric signal that was obtained in operation 541 is transmitted from the device to the base station.

In operation 543, the biometric signal is matched with a user profile that is stored at the base station. This allows the base station to identify the user that is attempting to utilize the device and the applications that are stored at the base station, and to simultaneously authenticate the user. In some implementations, the user makes an affirmative selection of a user profile before authentication using the biometric signal. This allows the base station to compare the biometric signal to a single profile only, without attempting to compare the biometric signal to other profiles. In other implementations, selection of the user profile is performed by comparing the biometric signal to multiple user profiles stored by the base station until a match is found.

In operation 544, the base station grants the device access to applications and/or other (collectively, "content items") that are associated with the user profile that was identified in operation 543 using the biometric signal. In operation 545 the content is transmitted to the device from the base station. As an example, the base station may transmit content to the device that causes a menu to be displayed by the device, where the menu includes representations of applications that have been identified as available for use by the user of the device, based on information stored as part of the user profile.

Figure 6:
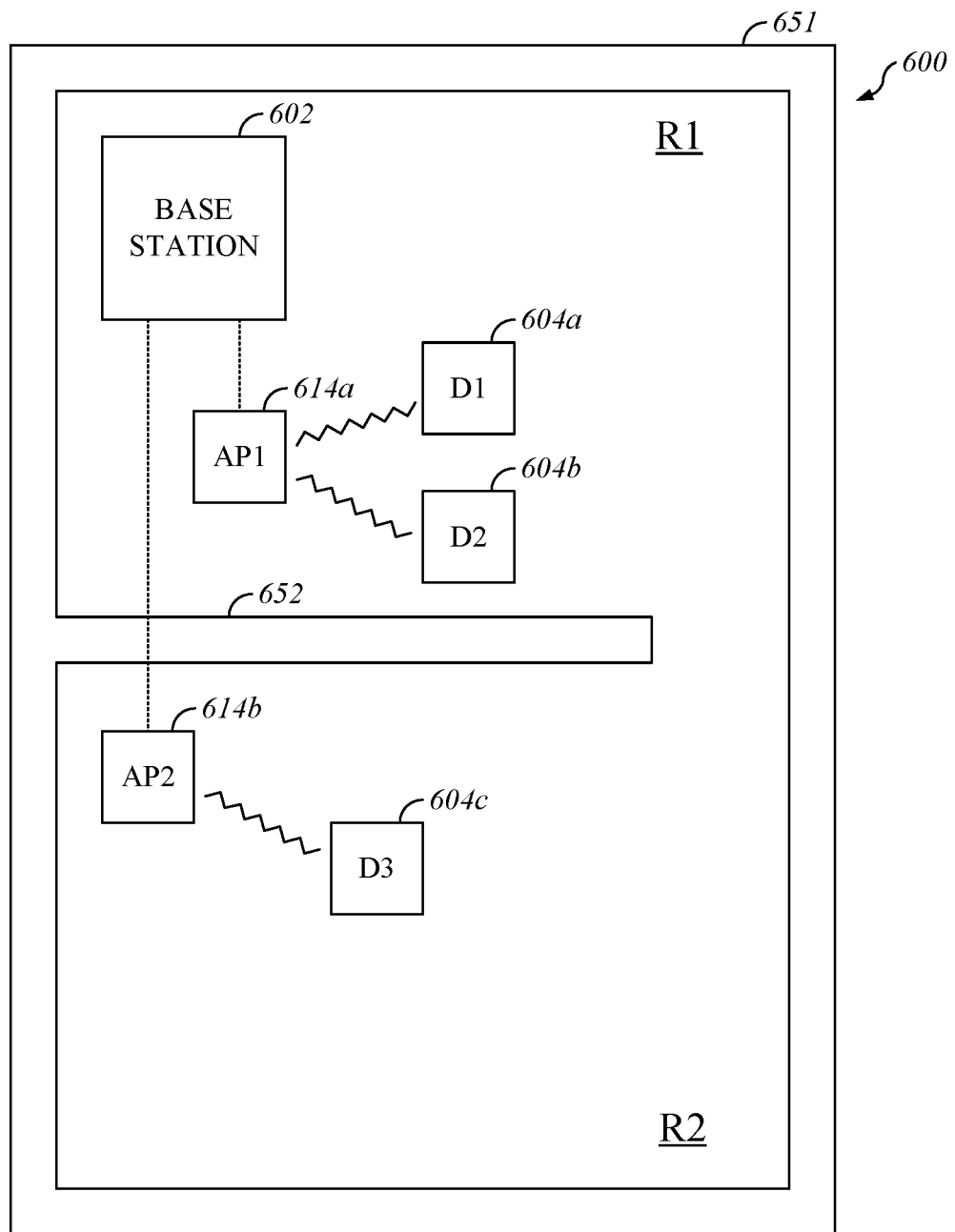
FIG. 6 is an illustration that shows an example of a computing system that is located in a building.

FIG. 6 is an illustration that shows an example of a computing system 600 that is located in a building 651. The building 651 is divided into a first room R1 and a second room R2 by a wall 652. The computing system includes a base station 602, a first device 604a, a second device 604b, and a third device 604c, which are configured according to the description of the base station 102 and the connected devices 104 of FIG. 1.

The base station 602 can communicate wirelessly with the first through third devices 604a-604c using a first access point 614a and a second access point 614b, which are wireless networking devices (e.g., wireless routers, wireless access points, antennas having wired connections to wireless routers or access points, wireless repeaters, etc.) that are directly or indirectly connected to the base station 602 by wired connections. The first access point 614a and the second access point 614*b* may be configured according to the description of the communications device 214 and likewise support wireless communications according to the previous description of the wireless communication link 106.

The first access point 614*a* is located in the first room R1 and the second access point 614*b* is located in the second room R2. The first access point 614*a* can communicate wirelessly with the first device 604*a* and the second device 604*b*, since they are also in the first room R1. Presence of the wall 652 blocks line-of-sight from the first access point 614*a* to the third device 604*c*, which prevents the third device 604*c* from communicating with the base station 602 using the first access point 614*a*. The second access point 614*b* can communicate wirelessly with the third device 604*c* since it is also in the second room R2. Presence of the wall 652 blocks line-of-sight from the second access point 614*b* to the first device 604*a* and the second device 604*b*, which prevents the first device 604*a* and the second device 604*b* from communicating with the base station 602 using the second access point 614*b*.

The base station 602 can determine, for each of the first through third devices 604*a*-604*c*, which of the access points is being used for communication with the base station 602. This information may be used by the base station for to allow or deny access to content to the first through third devices 604*a*-604*c* based on location. This allows room-specific content to be displayed to the user of a device, such as by presenting business applications on a menu when the device is in a room used as an office and, presenting entertainment media content when the device is in a living room or other entertainment-centric space, or presenting cooking-related applications and media when the device is in a kitchen. This also allows parental control (or equivalent content controls) to be applied on a room by room basis. For example, internet access could be restricted if the device is present in a first room, and permitted if the device is in a second room.

As one example, content access may be determined on a room-by-room basis (as well as a per device basis), such as by providing a respective one of the first through third devices 604*a*-604*c* access to a first group of one or more content items when the device is at a first location (e.g., the first room R1) and providing access to a second group of one or more content items when the device is at a second location (e.g., the second room R2).

If the first through third devices 604*a*-604*c* change locations, such as by moving from the first room R1 to the second room R2, the devices may lose communication with one of the first access point 614*a* or the second access point 614*b*, and establish communication with the other access point. This change can be used as a basis for determining that one of the devices has moved to a new location.

Figure 7:
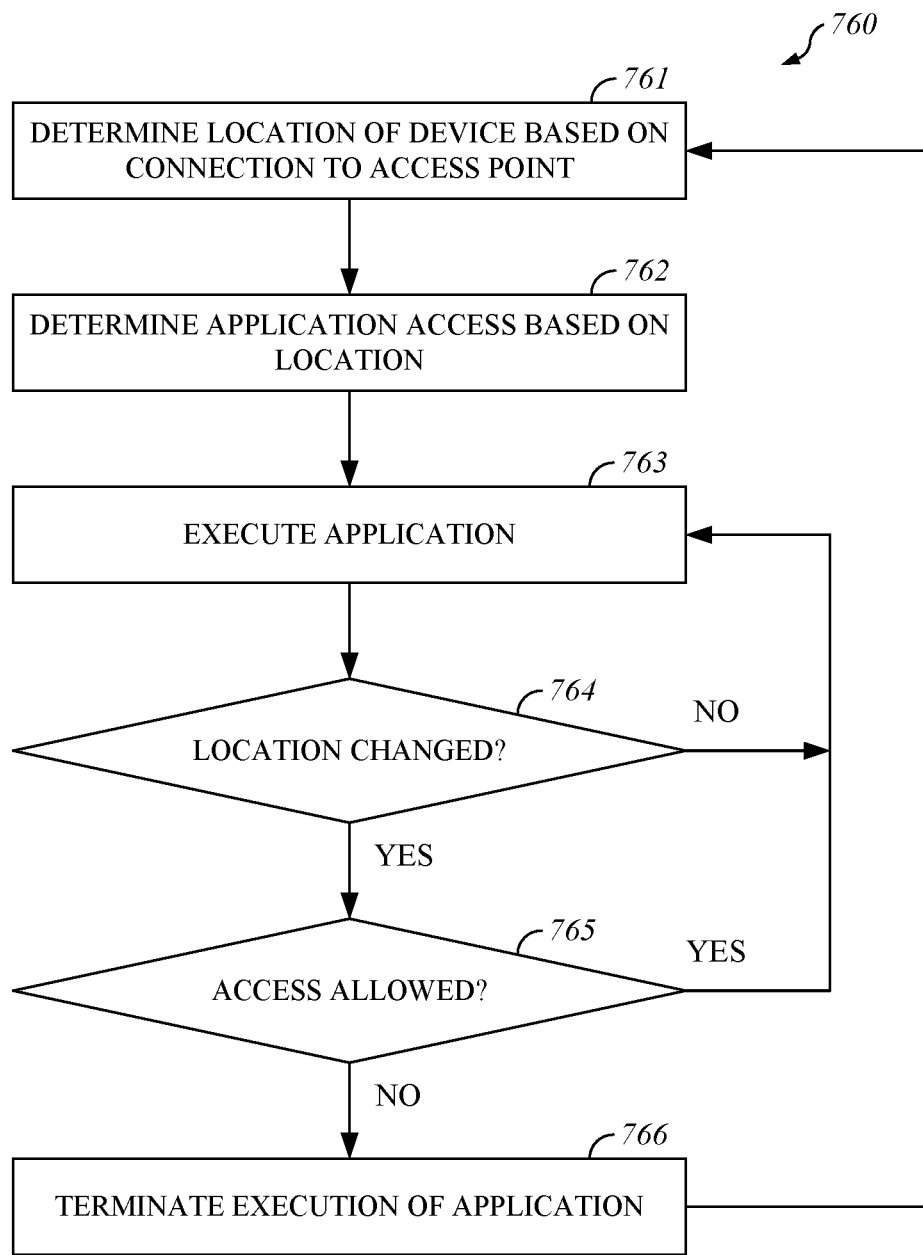
FIG. 7 is a flowchart that shows an example of a process for location-based access control and/or location based filtering of content.

FIG. 7 is a flowchart that shows an example of a process 760 for location-based access control and/or location based filtering of content. The process 760 may be performed, for example, using a computer device that includes a processor and a memory that stores program instructions, wherein the program instructions cause the processor to perform the operations that are included in the process 760 when the program instructions are executed by the processor. The process 760 can be performed using a base station that is connected to multiple access points and is able to establish a wireless communication link with one or more devices using one of the access points. As an example, the process 760 can be performed using the base station 602 and one or more of the first through third devices 604*a*-604*c* using the first access point 614*a* or the second access point 614*b*.

In operation 761 the location of a device is determined. The location is determined based on the identity of an access point that the device is using to communication with a base station using a line-of-sight dependent communication link by which data is transferred between the device and the base station. The access point is a line-of-sight dependent communication device that is associated with a known location, such as a room inside a building.

In operation 762, the base station determines application access for the device. Application access is determined in part based on the location of the device, as identified by the identity of the access point that the device is using to communicate with the base station. Application access may be further be determined based on a device type for the device (e.g., a first group of applications are made available to a tablet computer, while a second group of applications are made available to a virtual reality headset). Application access may be further determined by an identify of the user of the device, as described previously with respect to user profiles and authentication.

In one implementation, the location of the device is used to allow or deny access to applications or other content. Thus, an application is made available to the device by the base station when the device connects to the base station using a first access point (e.g., the first access point 614*a*) and the application is not made available to the device by the base station when the device connects to the base station using a second access point (e.g., the second access point 614*b*).

In another implementation, the location of the device is utilized to customize an application, such as a menu. For example, a home screen user interface for the device can display a first list of applications and/or utilize a first graphical theme the device connects to the base station using a first access point (e.g., the first access point 614*a*) and the home screen user interface for the device can display a second list of applications and/or utilize a second graphical theme when the device connects to the base station using a second access point (e.g., the second access point 614*b*).

In operation 763, the application is executed by the base station and corresponding content is transmitted to the device, which may include some or all of the operations explained with respect to the process 440. The application may be a user interface provided to the device without user selection, such as a location-filtered list of applications or location-specific version of the home screen user interface discussed previously. Or the application can be provided to the device based on user-selection of the application, subject to verification by the base station that access to the application is allowed based on the location of the device and optionally based on the device type and/or based on the identity of the user.

In operation 764, a determination is made as to whether the location of the device has changed. For example, the base station can determine that the location of the device has changed if the device has established a communications link with the base station using a different access point than the one used previously. If the location of the device has not changed, the process returns to operation 763. If the location of the device has changed, the process continues to operation 765.

In operation 765, a determination is made as to whether the device is allowed to access the currently-executing application from the current location. If the device is allowed to access the application from the current location, the process returns to operation 763 and execution of the application continues. If the device is not allowed to access the application from the current location, the process continues to operation 766 where execution of the application by the base station is terminated before the process 760 returns to operation 761.

Figure 8:
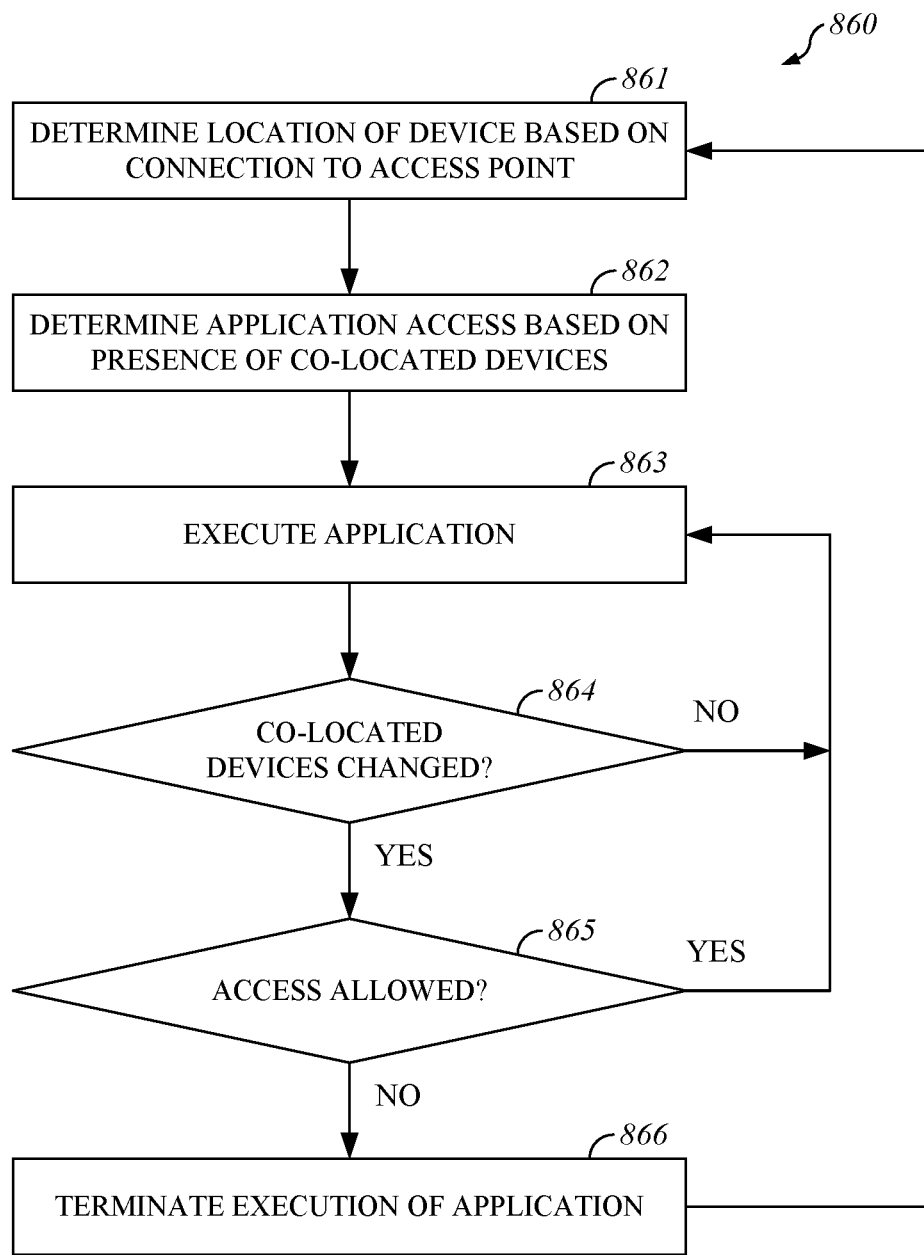
FIG. 8 is a flowchart that shows an example of a process for access control for content based on co-location of devices.

FIG. 8 is a flowchart that shows an example of a process 860 for access control for content based on co-location of devices. The process 860 may be performed, for example, using a computer device that includes a processor and a memory that stores program instructions, wherein the program instructions cause the processor to perform the operations that are included in the process 860 when the program instructions are executed by the processor. The process 860 can be performed using a base station that is connected to multiple access points and is able to establish a wireless communication link with one or more devices using one of the access points. As an example, the process 860 can be performed using the base station 602 and one or more of the first through third devices 604a-604c using the first access point 614a or the second access point 614b.

In operation 861 the location of a device is determined. The location is determined based on the identity of an access point that the device is using to communication with a base station using a line-of-sight dependent communication link by which data is transferred between the device and the base station. The access point may be associated with a known location, such as a room inside a building.

In operation 862, the base station determines application access for the device based on the presence of co-located devices. Co-located devices are other devices that are present at the same location as the device, as identified by the identity of the access point that the device and the co-located devices are using to communicate with the base station. As an example, the base station may utilize an access list or access control policy that allows access to applications and other content only when all the devices (and/or the users currently using the devices) are allowed to access the applications or other content. For example, a parental controls policy may specify that use of certain applications or media items is not allowed when a device associated with a specific user (e.g., a child) is present at the same location. In some implementations, operation 862 may include determining a list of co-located devices and determining whether all devices from the list of co-located devices are allowed to access a particular application.

After determining that access to the application is permitted, in operation 863, the application is executed by the base station and corresponding content is transmitted to the device, which may include some or all the operations explained with respect to the process 440.

In operation 864, a determination is made as to whether the co-located devices have changed. For example, the co-located devices may change when any device enters or leaves the location, thus starting or ending communications with the base station using the same access point as the device. If the co-located devices have not changed, the process returns to operation 863. If the co-located devices have changed, the process proceeds to operation 865.

In operation 865, a determination is made as to whether the device is allowed to access the currently-executing application based on the present co-located devices. This may be performed as described with respect to operation 862. If the device is allowed to access the currently-executing application, the process returns to operation 863 where execution of the application continues. If the device is not allowed to access the currently-executing application, the process proceeds to operation 866, in which execution of the application terminates before the process returns to operation 861.

Figure 9:
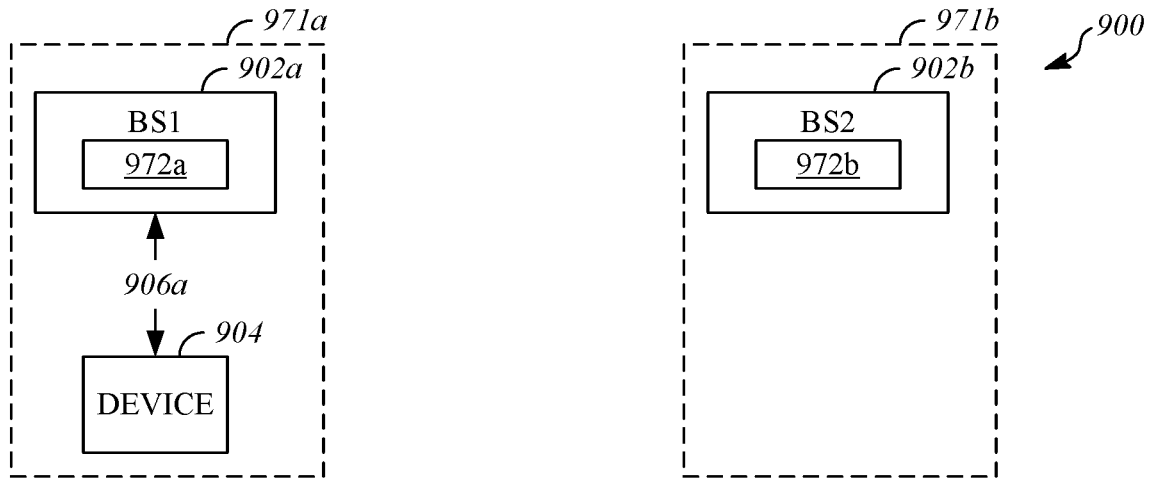
FIG. 9 is an illustration of a computing system that includes a first base station, a second base station, and a device, in which the device is connected to the first base station by a first wireless communication link.

FIG. 9 is an illustration of a computing system 900 that includes a first base station 902a, a second base station 902b, and a device 904, in which the device 904 is connected to the first base station 902a by a first wireless communication link 906a. The components of computing system 900 are as described with respect to the computing system 100 except as otherwise described herein.

The first base station 902a is located at a first location 971a. As an example, the first location could be a workplace. While the device 904 is connected to the first base station 902a, first user data 972a is stored at the first base station 902a. The second base station 902b is located at a second location 971b. As an example, the second location could be a residence. While the device 904 is connected to the second base station 902b, second user data 972b is stored at the second base station 902b. The first location 971a and the second location 971b can be locations that are remote from each other such that, for example, the device 904 cannot connect to the second base station 902b while it is located at the first location 971a, and vice versa.

Figure 10:
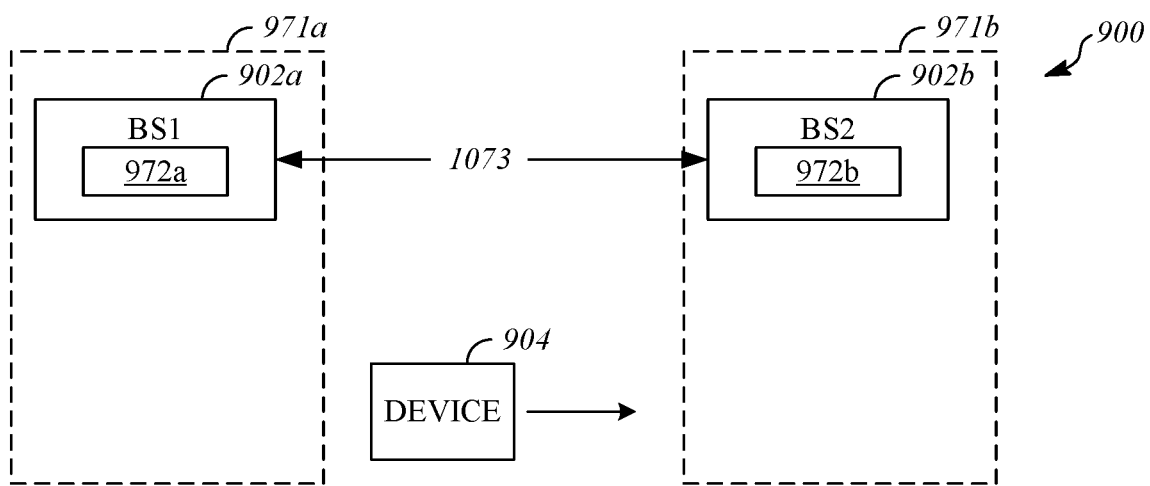
FIG. 10 is an illustration of the computing system, in which the device is in transit between the first location and the second location.

FIG. 10 is an illustration of the computing system 900, in which the device 904 is in transit between the first location 971a and the second location 971b. In response to determining that the device 904 is no longer connected to the first base station 902a, the first base station can synchronize the first user data 972a with the second user data 972b at the second base station 902b. For example, the first base station 902a could transmit some or all the first user data 972a to the second base station 902b using a data connection 1073 that is established using wired and/or wireless communications networks, which may include, for example, the Internet. The transmitted data is used to update or replace some or all the second user data 972b, such that the same information is included in the first user data 972a and the second user data 972b, such that the two sets of data are synchronized.

Figure 11:
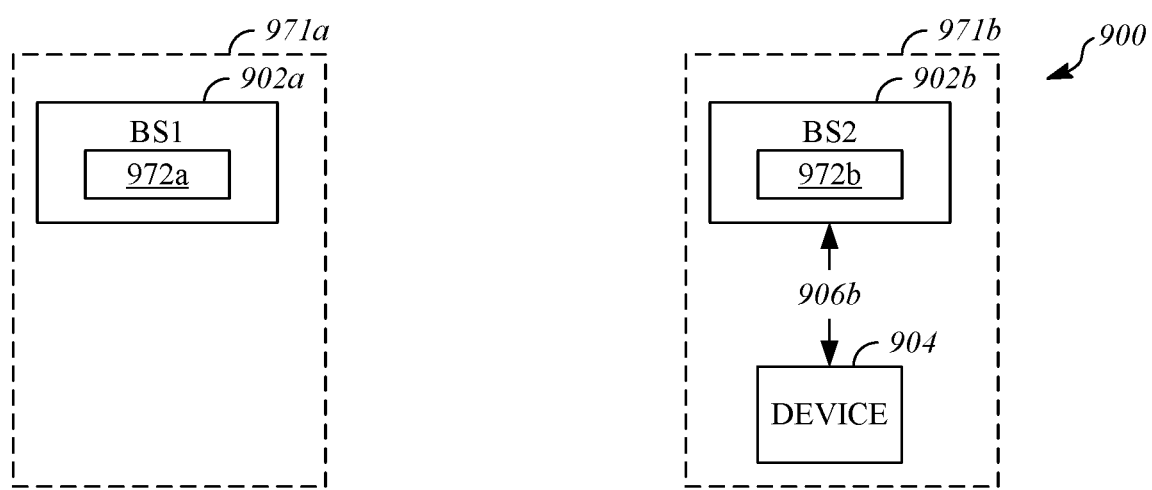
FIG. 11 is an illustration of the computing system, in which the device is connected to the second base station by a second wireless communication link.

FIG. 11 is an illustration of the computing system 900, in which the device 904 is connected to the second base station 902b by a second wireless communication link 906b. The second base station 902b provides computing resources to the device 904 while using the second user data 972b. Connection of the device 904 and use of the computing resources of the second base station 902b may commence after synchronization of the first user data 972a and the second user data 972b.

Figure 12:
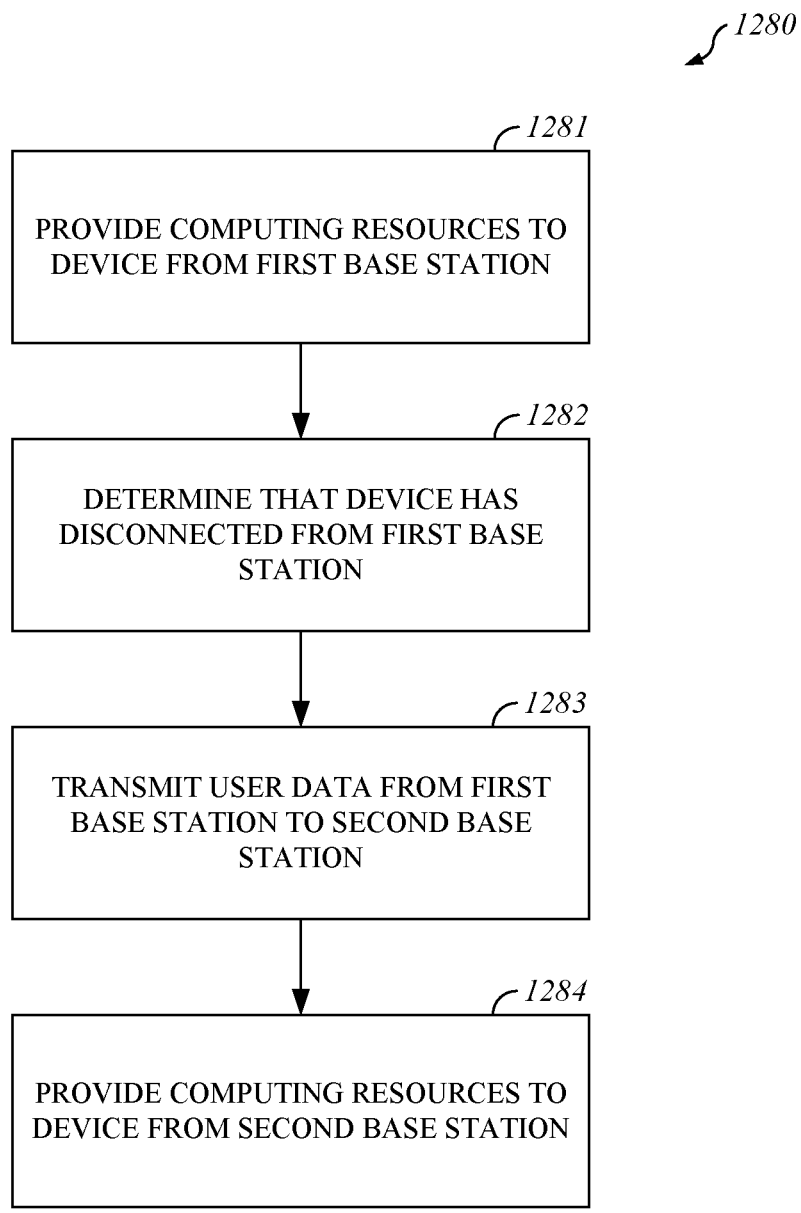
FIG. 12 flowchart that shows an example of a process for synchronizing data.

FIG. 12 is a flowchart that shows an example of a process 1280 for access control for content based on co-location of devices. The process 1280 may be performed, for example, using a computer device that includes a processor and a memory that stores program instructions, wherein the program instructions cause the processor to perform the operations that are included in the process 1280 when the program instructions are executed by the processor. As an example, the process 1280 can be performed using the first base station 902a, the second base station 902b, and the device 904.

In operation 1281 computing resources are provided to a device by a first base station at a first location. For example, operation 1281 can be performed in accordance with the description of the computing system 900, by providing computing resources to the device 904 from the first base station 902a while the device 904 is present near the first base station 902a, such as by presence of the device 904 at the first location 971a. While computing resources are being provided to the device, data may be stored and/or modified by the base station, as described in connection with storage of first user data 972a by the first base station 902a.

In operation 1282, the first base station determines that the device has disconnected from the first base station. As an example, the first base station 902a can detect that the first wireless communication link 906a is no longer active, in response to receiving information indicating a disconnection of the device 904, or in response to detecting that no communication has been received from the device 904 over a period of time that is greater than a predetermined period of time.

In operation 1283, in response to determining that the device has disconnected from the first base station, the user data that was stored and/or modified while the first base station was providing computing resources to the device is transmitted to a second base station. During operation 1283, the device may be in transit (e.g., carried by a person travelling from their place of business to their home) from a first location associated with the first base station to a second location associated with a second base station, as described with respect to transportation of the device 904 from the first location 971a to the second location 971b. Transmission of the user data can be performed in the manner described with synchronization of the first user data 972a and the second user data 972b using the data connection 1073.

In operation 1284 computing resources are provided to the device by the second base station at the second location. For example, operation 1284 can be performed in accordance with the description of the computing system 900, by providing computing resources to the device 904 from the second base station 902b while the device 904 is present near the second base station 902b, such as by presence of the device 904 at the second location 971b. While computing resources are being provided to the device, data may be stored and/or modified by the base station, for example, by modification and/or storage of the second user data 972b by the second base station 902b.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to allow computing resources to be provided to users across multiple devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify the devices that are being used by a user and to identify the computing resources needed based on the applications being used on those devices. Accordingly, use of such personal information data enables calculated control of the computing resources that are provided to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing computing resources, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, computing resources may be provided by inferring preferences based on non-personal information data or a bare minimum amount of personal information, such as the content being requested by the device associated with a user, other non-personal information available to the computing resource services, or publicly available information.

What is claimed is:

1. A system, comprising:
   a base station;
   a first device;
   a second device;
   access points that each provide line-of-sight dependent wireless communication with the first device and the second device to allow data transmission between the base station and the first device and the second device; and
   wherein the base station provides the first device with access to a first group of content items when the first device and the second device are determined to be co-located based on connection of the first device and the second device to a same access point from the access points, and
   wherein the base station provides the first device with access to a second group of content items when the first device and the second device are not determined to be co-located.

2. The system of claim 1, wherein the base station causes a user interface screen of the first device to use a first graphical theme when the first device and the second device are determined to be co-located, and the base station causes the user interface screen of the first device to use a second graphical theme when the first device and the second device are not determined to be co-located.

3. The system of claim 1, wherein the first group of applications and the second group of applications are dependent on a device type for the first device.

4. The system of claim 1, wherein the first group of applications and the second group of applications are dependent on an identity of a user of the first device.

5. The system of claim 4, wherein the identity of the user of the first device is determined by the base station using a biometric signal that is received from the first device.

6. The system of claim 1, wherein the access points are each operable to communicate with the first device using a 60 GHz frequency band.

7. A method, comprising:
   providing computing resources to a device from a first base station using a first line-of-sight dependent wireless communication link;
   storing first user data at the first base station;
   determining that the device has disconnected from the first base station;
   in response to determining that the device has disconnected from the first base station, transmitting at least some of the first user data from the first base station to a second base station to define second user data at the second base station so that the second user data is synchronized with the first user data such that the first user data and the second user data include the same information; and
   providing computing resources to the device from the second base station using a second line-of-sight dependent wireless communication link and based in part on the second user data.

8. The method of claim 7, wherein the first base station is at a first location, the second base station is at a second location, and the first location is remote from the second location such that the device cannot connect to the second base station using the second line-of-sight dependent wireless communication link while the device is present at the first location.

9. The method of claim 8, wherein transmitting at least some of the user data from the first base station to the second base station to define the second user data at the second base station occurs while the device is disconnected from the first base station and the second base station.

10. The method of claim 8, wherein the first line-of-sight dependent wireless communication link and the second line-of-sight dependent wireless communication link use a 60 GHz frequency band.

11. A method, comprising:
    providing line-of-sight dependent wireless communication with a first device and a second device using access points to allow data transmission between a base station and the first device and the second device;
    determining whether the first device and the second device are co-located based on connection of the first device and the second device to a same access point from the access points;
    providing the first device with access to a first group of content items from the base station when the first device and the second device are determined to be co-located; and
    providing the first device with access to a second group of content items from the base station when the first device and the second device are not determined to be co-located.

12. The method of claim 11, further comprising:
    causing a user interface screen of the first device to use a first graphical theme when the first device and the second device are determined to be co-located, and causing the user interface screen of the first device to use a second graphical theme when the first device and the second device are not determined to be co-located.

13. The method of claim 11, wherein the first group of applications and the second group of applications are dependent on a device type for the first device.

14. The method of claim 11, wherein the first group of applications and the second group of applications are dependent on an identity of a user of the first device.

15. The method of claim 14, wherein the identity of the user of the first device is determined by the base station using a biometric signal that is received from the first device.

16. The method of claim 11, wherein the access points are each operable to communicate with the first device using a 60 GHz frequency band.

17. A system, comprising:
a device;
a first base station; and
a second base station,
wherein the first base station is operable to:
provide computing resources to a device from a first base station using a first line-of-sight dependent wireless communication link,
store first user data at the first base station,
determine that the device has disconnected from the first base station, and
in response to determining that the device has disconnected from the first base station, transmit at least some of the first user data from the first base station to a second base station to define second user data at the second base station so that the second user data is synchronized with the first user data such that the first user data and the second user data include the same information, and
wherein the second base station is operable to:
provide computing resources to the device from the second base station using a second line-of-sight dependent wireless communication link and based in part on the second user data.

18. The system of claim 17, wherein the first base station is at a first location, the second base station is at a second location, and the first location is remote from the second location such that the device cannot connect to the second base station using the second line-of-sight dependent wireless communication link while the device is present at the first location.

19. The system of claim 18, wherein transmitting at least some of the user data from the first base station to the second base station to define the second user data at the second base station occurs while the device is disconnected from the first base station and the second base station.

20. The system of claim 18, wherein the first line-of-sight dependent wireless communication link and the second line-of-sight dependent wireless communication link use a 60 GHz frequency band.

* * * * *